F. RHIND.
Lamp-Bowl.
No. 209,077. Patented Oct. 15, 1878.
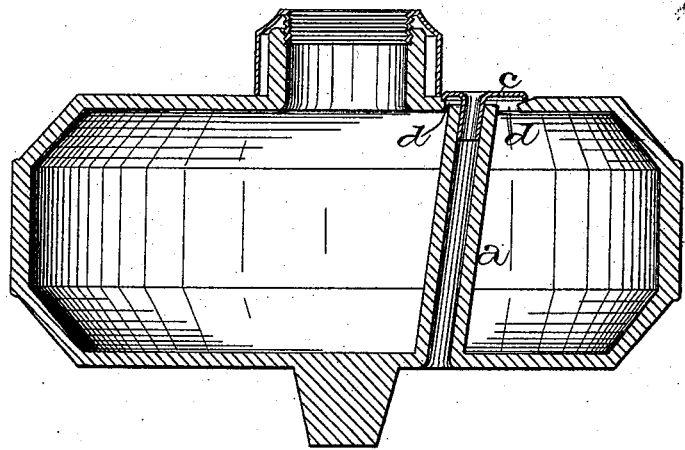
Witnesses.
J. W. Garner
H. S. D. Haines
Inventor.
Frank Rhind,
per
F. A. Lehmann,
Atty.

UNITED STATES PATENT OFFICE.

FRANK RHIND, OF BROOKLYN, NEW YORK, ASSIGNOR TO EDWARD GOVE.

IMPROVEMENT IN LAMP-BOWLS.

Specification forming part of Letters Patent No. 209,077, dated October 15, 1878; application filed October 2, 1878.

*To all whom it may concern:*

Be it known that I, FRANK RHIND, of Brooklyn, in the county of Kings and State of New York, have invented certain new and useful Improvements in Lamp-Bowls; and I do hereby declare the following to be a full, clear, and exact description of the invention, such as will enable others skilled in the art to which it pertains to make and use it, reference being had to the accompanying drawings, which form part of this specification.

My invention relates to an improvement in bowls for self-extinguishing lamps; and it consists in making the glass tube through which the extinguisher-rod passes extend up in the bowl near to or through the upper wall, and then placing a metallic connection, having a hole for the rod to pass through, upon its upper end, so as to connect it air and water tight to the bowl, as will be more fully described hereinafter.

The accompanying drawing represents a vertical section of my invention.

Letters Patent of the United States were granted to me November 2, 1875, No. 169,479, for a method of blowing glass spheres, in which the tube for the extinguisher-rod is shown as being united, in one solid piece, to the bowl at both ends. Owing to the fact that the top of the bowl is thinner than the bottom and cools more quickly when the tube is pushed up through the bowl, very hot and partially-cooled glass are brought in contact, and the consequence is that the unequal expansion and contraction frequently cause the bowls to break after being cooled. The object of my present invention is to overcome that defect.

As here shown, the tube $a$ is not joined to the top of the bowl, but reaches up near to or just through the opening $d$ made in it by breaking away the small bulb or nipple which is formed at this point by blowing the glass up through a hole made in the molds. A cap or cover, $c$, made of metal or other suitable material, is then placed in and upon the upper end of the tube and over the opening in the bowl, and cemented, so as to remain firmly in place. As the tube does not join the bowl, it is obvious that there can be no unequal expansion and contraction, for each part is independent of the other. By the use of this cap for joining the parts together all the advantages of forming the tube with the bowl are preserved, while the great expense of breakage or additional annealing is done away with.

Having thus described my invention, I claim—

1. A bowl or sphere in which the tube $a$ is formed with the bowl and has its upper end joined to the top of the bowl by means of a cap, substantially as shown.

2. As a new article of manufacture, a glass globe or bowl having an opening to receive the usual burner and collar, a glass tube forming an integral part of the bowl, and which projects up at one side of the central opening, and an opening, $d$, close to one side of the main opening, substantially as specified.

In testimony that I claim the foregoing I have hereunto set my hand this 2d day of October, 1878.

FRANK RHIND.

Witnesses:
R. M. BARR,
J. W. GARNER.